US008027016B2

United States Patent
Choi et al.

(10) Patent No.: US 8,027,016 B2
(45) Date of Patent: *Sep. 27, 2011

(54) PANEL FOR A LIQUID CRYSTAL DISPLAY AND METHOD OF FORMING THE SAME

(75) Inventors: Woo Choi, Cheonan (KR); Jun-Yeob Lee, Koyang (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 93 days.

This patent is subject to a terminal disclaimer.

(21) Appl. No.: 12/205,630

(22) Filed: Sep. 5, 2008

(65) Prior Publication Data

US 2008/0316419 A1    Dec. 25, 2008

Related U.S. Application Data

(63) Continuation of application No. 11/542,977, filed on Oct. 4, 2006, now Pat. No. 7,428,033, which is a continuation of application No. 10/714,495, filed on Nov. 14, 2003, now Pat. No. 7,142,277.

(30) Foreign Application Priority Data

Nov. 14, 2002   (KR) .................................. 2002-70705

(51) Int. Cl.
    *G02F 1/1339*     (2006.01)
(52) U.S. Cl. ........................................ 349/187; 349/156
(58) Field of Classification Search .............. 349/42, 349/153, 155, 156, 157, 187, 190; 445/25; 438/30

See application file for complete search history.

(56) References Cited

U.S. PATENT DOCUMENTS

| | | | |
|---|---|---|---|
| 4,678,282 A | 7/1987 | Yaniv et al. | |
| 5,929,962 A | 7/1999 | Chiu et al. | |
| 6,414,733 B1 * | 7/2002 | Ishikawa et al. | 349/110 |
| 6,501,527 B1 | 12/2002 | Hirose et al. | |
| 2001/0026347 A1 | 10/2001 | Sawasaki et al. | |
| 2002/0154266 A1 * | 10/2002 | Choo et al. | 349/187 |
| 2003/0048403 A1 * | 3/2003 | Satoh | 349/156 |
| 2003/0112405 A1 * | 6/2003 | Kim et al. | 349/156 |
| 2004/0114087 A1 * | 6/2004 | Cho et al. | 349/155 |

FOREIGN PATENT DOCUMENTS

| | | |
|---|---|---|
| CN | 1343542 | 4/2002 |
| EP | 0605146 A1 | 7/1994 |
| JP | 10-048641 | 2/1998 |
| JP | 10-104640 | 4/1998 |
| JP | 10-104641 | 4/1998 |
| JP | 11-305239 | 11/1999 |
| JP | 2000267113 | 9/2000 |
| JP | 2000298280 | 10/2000 |
| JP | 2001-142076 | 5/2001 |
| JP | 2001-159707 | 6/2001 |
| JP | 2001296529 | 10/2001 |
| JP | 2002-082339 | 3/2002 |
| JP | 2002-148633 | 5/2002 |

* cited by examiner

*Primary Examiner* — Dung Nguyen
*Assistant Examiner* — Tai Duong
(74) *Attorney, Agent, or Firm* — F. Chau & Associates, LLC.

(57) ABSTRACT

A panel for a liquid crystal display including a substrate, and at least one spacer formed over the substrate. The at least one spacer has a tapered shape with an inclination angle in the range of about 20- about 70 degrees and a height in the range of about 2.5- about 5.0 microns.

7 Claims, 6 Drawing Sheets

PANEL FOR A LIQUID CRYSTAL DISPLAY AND METHOD OF FORMING THE SAME

CROSS REFERENCE TO RELATED APPLICATIONS

This application is a continuation of U.S. patent application Ser. No. 11/542,977, filed on Oct. 4, 2006, now U.S. Pat. No. 7,428,033 which is a Continuation of U.S. patent application Ser. No. 10/714,495 filed on Nov. 14, 2003, now U.S. Pat. No. 7,142,277, and which claims priority to Korean Patent Application No. 2002-0070705, filed Nov. 14, 2002 in the Korean Intellectual Property Office (KIPO), all of which are fully incorporated herein by reference.

BACKGROUND (a) Technical Field

The present disclosure relates to a panel for a liquid crystal display, and in particular, to a liquid crystal display panel including spacers.

(b) Disclosure of Related Art

A conventional liquid crystal display (LCD) includes two panels in which at least one of the two panels is coated with an alignment layer and includes field-generating electrodes. A liquid crystal (LC) layer having dielectric anisotropy is filled in a gap (called a cell gap) between the panels. Electric fields are applied to the LC layer by the field-generating electrodes and the transmittance of light through the panels is controlled by adjusting the field strength, thereby displaying desired picture images.

The two panels are assembled by printing a sealant along a periphery of one of the panels and by hot-pressing the panels.

The cell gap is maintained by elastic spacers provided between the panels and spacers included in the sealant. The LC layer is encapsulated by the sealant. The spacers includes spherical spacers spread on the panels and columnar spacers formed by photolithography.

The columnar spacers are vertically compressed to support the panels. When the cross sections of the spacers are too small, the spacers are apt to be deformed or to be damaged due to large compression deformation. If the cross sections of the spacers are too large, it is difficult to adjust the amount of the LC material to be filled in the gap between the panels due to the small compression deformation of the spacers. The inappropriate amount of the LC causes bubbles or non-uniform distribution of the LC.

As LCDs are made larger, it becomes important to keep the cell gap uniform to facilitate proper formation of the LC layer.

SUMMARY OF THE INVENTION

A panel for a liquid crystal display according to an embodiment of the invention includes a substrate, and at least one spacer formed over the substrate. The at least one spacer has a tapered shape with an inclination angle in the range of about 20- about 70 degrees and a height in the range of about 2.5- about 5.0 microns.

A liquid crystal display according to embodiment of the invention includes a first panel, a second panel disposed opposite the first panel, and a liquid crystal layer and at least one spacer disposed between the first panel and the second panel. The spacer has a tapered shape with an inclination angle in the range of about 20- about 70 degrees and a height in the range of about 2.5- about 5.0 microns.

A method of forming a liquid crystal display according to an embodiment of the invention includes forming a thin film transistor array panel including a plurality of pixel electrodes, and forming a plurality of spacers over the thin film transistor array panel between the plurality of pixel electrodes. A common electrode panel is formed and a sealant is coated over at least one of the thin film transistor array panel and the common electrode panel. A liquid crystal layer is formed over the at least one of the thin film transistor array panel and the common electrode panel coated with the sealant. The thin film transistor array panel and the common electrode panel are adhered together to form a panel assembly, and the panel assembly is scribed to form a liquid crystal display.

In at least one embodiment of the invention, the spacers are located directly over the data lines.

BRIEF DESCRIPTION OF THE DRAWINGS

The present invention will become more apparent by describing preferred embodiments thereof in detail with reference to the accompanying drawings in which.

DETAILED DESCRIPTION OF PREFERRED EMBODIMENTS

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout.

A panel assembly for LCDs according to an embodiment of the present invention win be now described in detail with reference to FIGS. 1 and 2.

Figure 1:
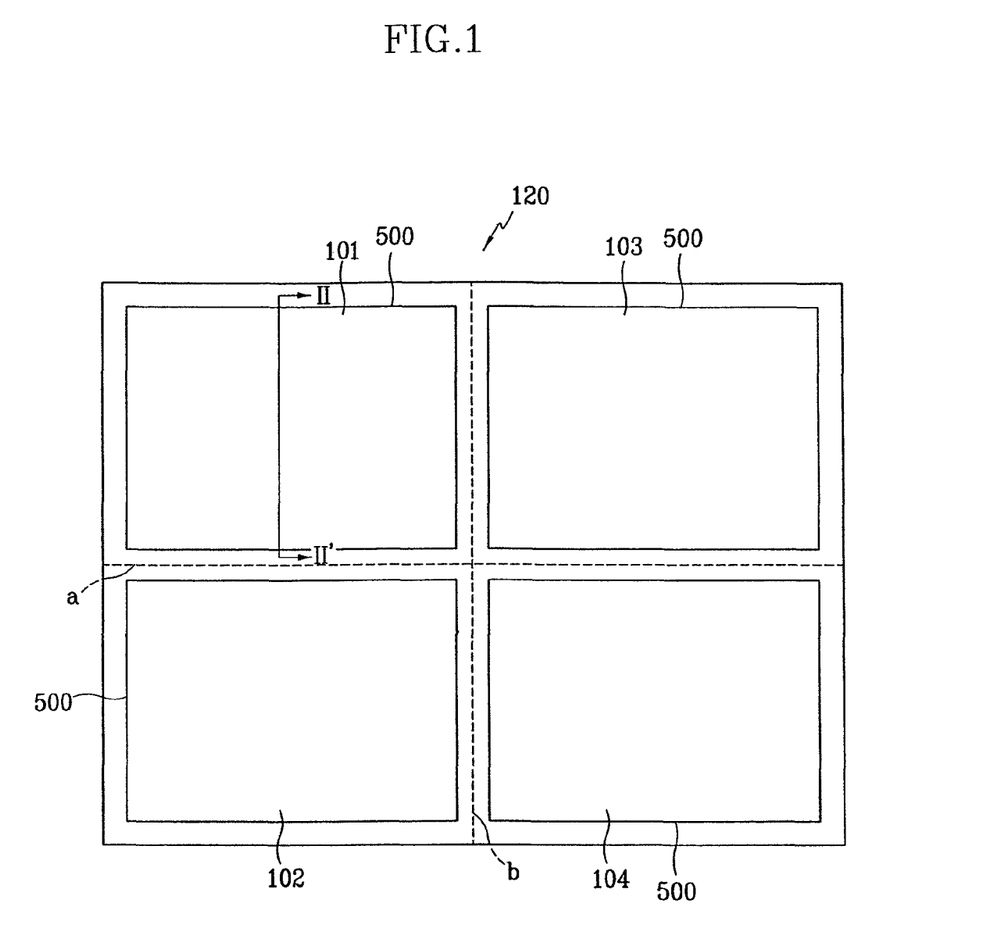
FIG. 1 is a plan view of a panel assembly for an LCD according to an embodiment of the present invention.
Figure 2:
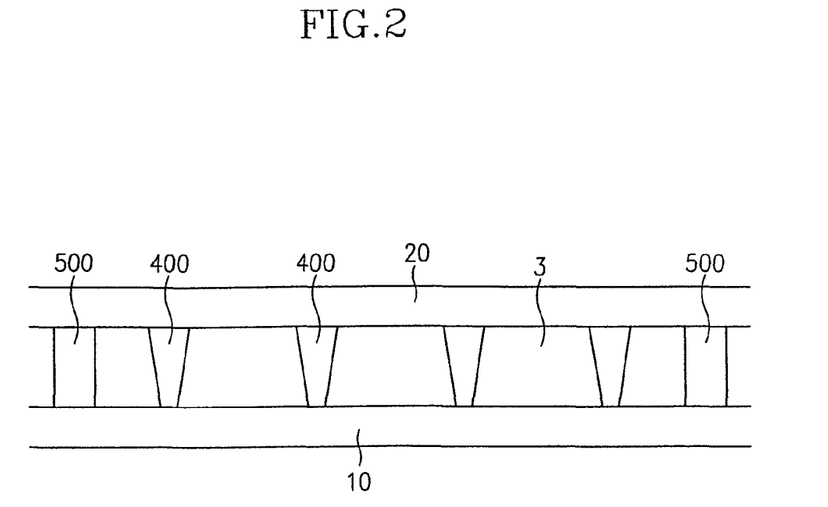
FIG. 2 is a sectional view of the panel assembly shown in FIG. 1 taken along the line II-II'.

FIG. 1 is a plan view of a panel assembly for LCDs according to an embodiment of the present invention and FIG. 2 is a sectional view of the panel assembly shown in FIG. 1 taken along the line II-II'.

As shown in FIGS. 1 and 2, a panel assembly 120 according to an embodiment of the present invention includes two panels 10 and 20 and a plurality of LC layers 3, a plurality of sealants 500, and a plurality of columnar spacers 400, which are disposed between the two panels 10 and 20.

The panel assembly 120 includes a plurality of, for example, four device areas divided by dotted lines A and B.

The panel assembly 120 is separated into the respective LCDs by scribing the panel assembly 120 along the dotted lines A and B.

Each of the device areas (or an LCD) includes a display area 101, 102, 103 or 104 for displaying images. The display areas 101-104 are substantially enclosed by the sealant 500, which also confines the LC layer 3. The LC layer 3 may be formed after the panel assembly 120 is separated into the respective devices.

The spacers 400 are provided for maintaining a uniform gap between the panels 10 and 20 and the sealant 500 may contain spacers for supporting the panels 10 and 20 parallel to each other.

The spacers 400 have a compression deformation equal to or larger than about 0.40 microns in response to 5 gf and are compressed by about 0.2 microns. The concentration of the spacers 400 is preferably about 250-450/cm$^2$.

A method of manufacturing the spacers shown in FIG. 2 according to an embodiment of the present invention is described in detail with reference to FIGS. 3 and 4.

Figure 3:
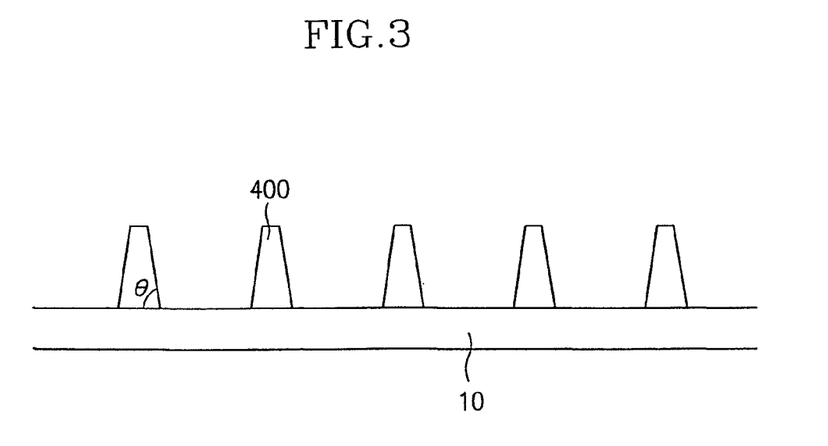
FIG. 3 is a sectional view of a panel and a plurality of column spacers formed thereon for the LCD shown in FIG. 2 before panel combination according to an embodiment of the present invention.

FIG. 3 is a sectional view of a panel and a plurality of column spacers formed thereon for an LCD before panel combination according to an embodiment of the present invention.

Referring to FIG. 3, a negative acrylic photoresist (not shown) is coated on an LC panel 10. An exposure mask (not shown) including an opaque film having a plurality of transmissive areas, such as openings, is disposed on the panel 10. The photoresist is then exposed to light through the exposure mask and developed to form a plurality of spacers 400 at desired positions.

Each contact area between the spacer 400 and the panel 10 may be circular or tetragonal and has a magnitude preferably in a range of about 600 to 1,000 square microns. For a circular contact area, the diameter of the circle is preferably equal to about 28-38 microns.

The height of the spacers 400 is about 2.5-5.0 microns. The spacers 400 preferably have a tapered shape with an inclination angle θ of about 20-70 degrees.

The spacers 400 have optimal compression deformation and disperse the stress exerted on the panels 10 and 20. The spacers 400 maintain a uniform cell gap between the two panels 10 and 20 and facilitate proper adjustment of an amount of LC for forming the liquid crystal layer 3.

One of the panels 10 and 20 shown in FIGS. 1 and 2 is a thin film transistor (TFT) array panel provided with a plurality of gate lines (not shown) and a plurality of data lines (not shown) for transmitting electrical signals such as scanning signals and data signals, a plurality of TFTs (not shown) electrically connected to the gate lines and the data lines for controlling the data signals, and a plurality of pixel electrodes (not shown) that receive the data voltages for driving the LC molecules.

The other of the panels 10 and 20 shown in FIGS. 1 and 2 is provided with a common electrode (not shown) facing the above-described pixel electrodes to generate electric fields for driving the LC molecules, and a plurality of color filters (not shown) for color display. The colors represented by the color filters preferably include three primary colors, i.e., red, green and blue.

In other embodiments of the invention, the color filters and/or the common electrode may be formed on the TFT array panel and the common electrode on the TFT array panel may have a shape of a bar or a stripe.

Figure 4:
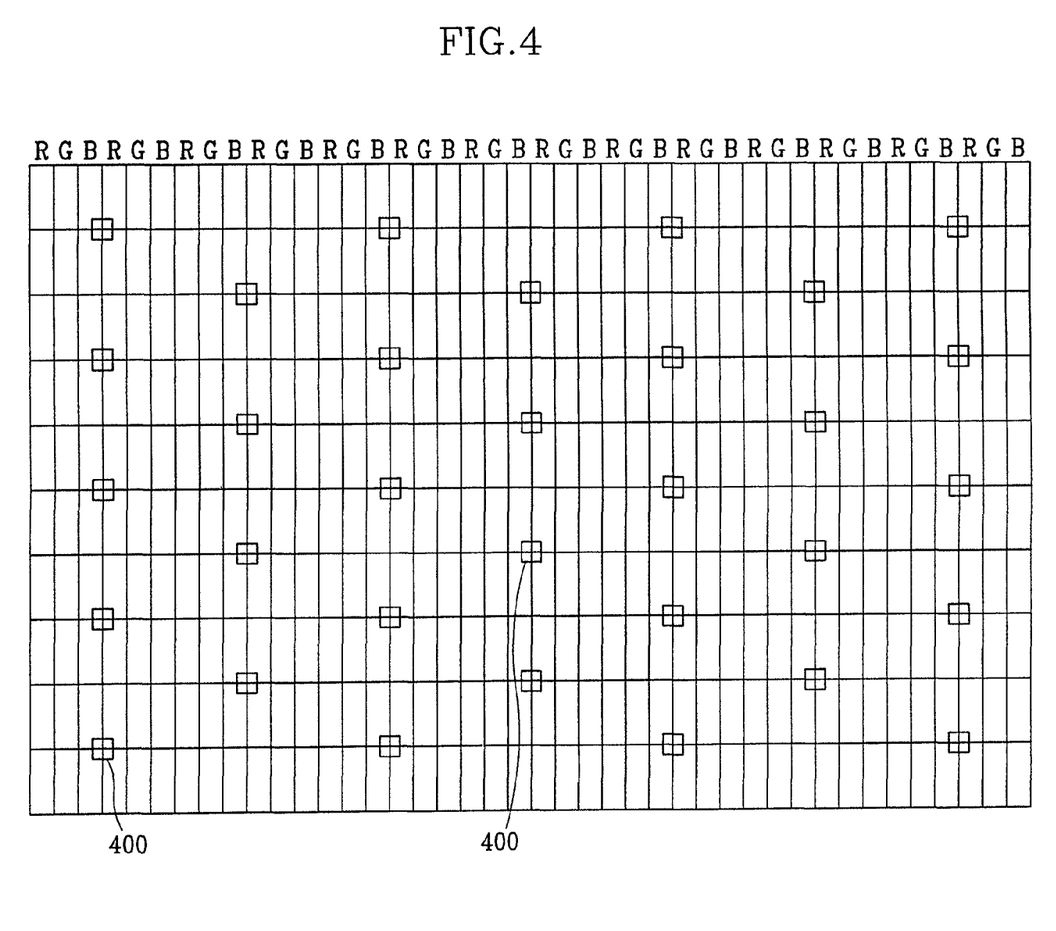
FIG. 4 shows locations of the first and the second spacers 400 shown in FIG. 2 according to an exemplary embodiment of the present invention.

FIG. 4 shows locations of the spacers 400 shown in FIG. 2 according to an exemplary embodiment of the present invention.

Referring to FIG. 4, a plurality of red, green and blue color filters R, G and B are arranged in a stripe type. The spacers 400 are arranged in a regular or periodic manner along a row direction and a column direction. For example, the spacers 400 are located between the blue filters B and the red filters R and spaced apart from each other by predetermined transverse and longitudinal distances as shown in FIG. 4. In particular, the spacers 400 are preferably located over the gate lines, the data lines, or the TFTs.

An LC panel assembly according to an exemplary embodiment of the present invention will be described in more detail with reference to FIGS. 5-7.

Figure 5:
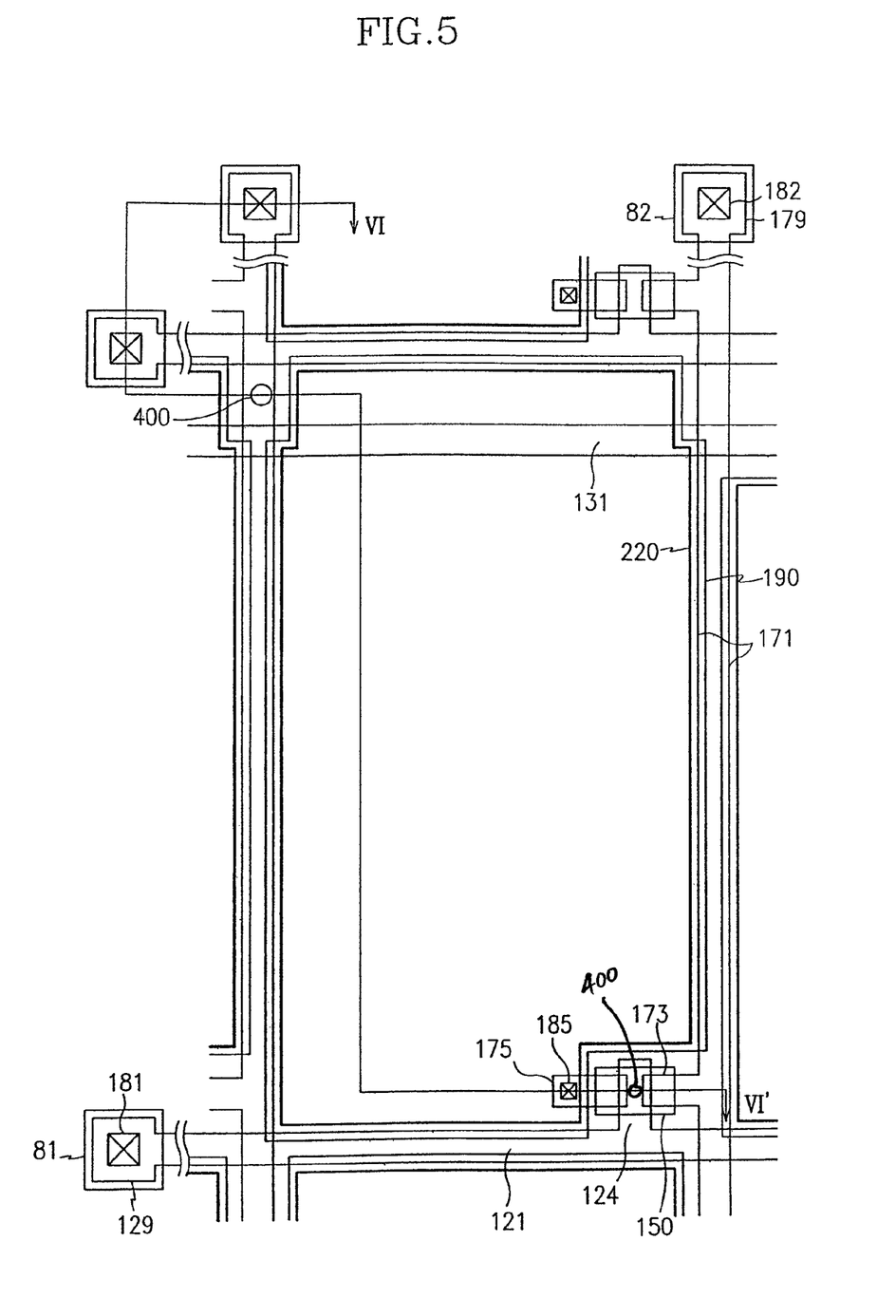
FIG. 5 is a layout view of an LCD according to exemplary embodiments of the present invention.
Figure 6:
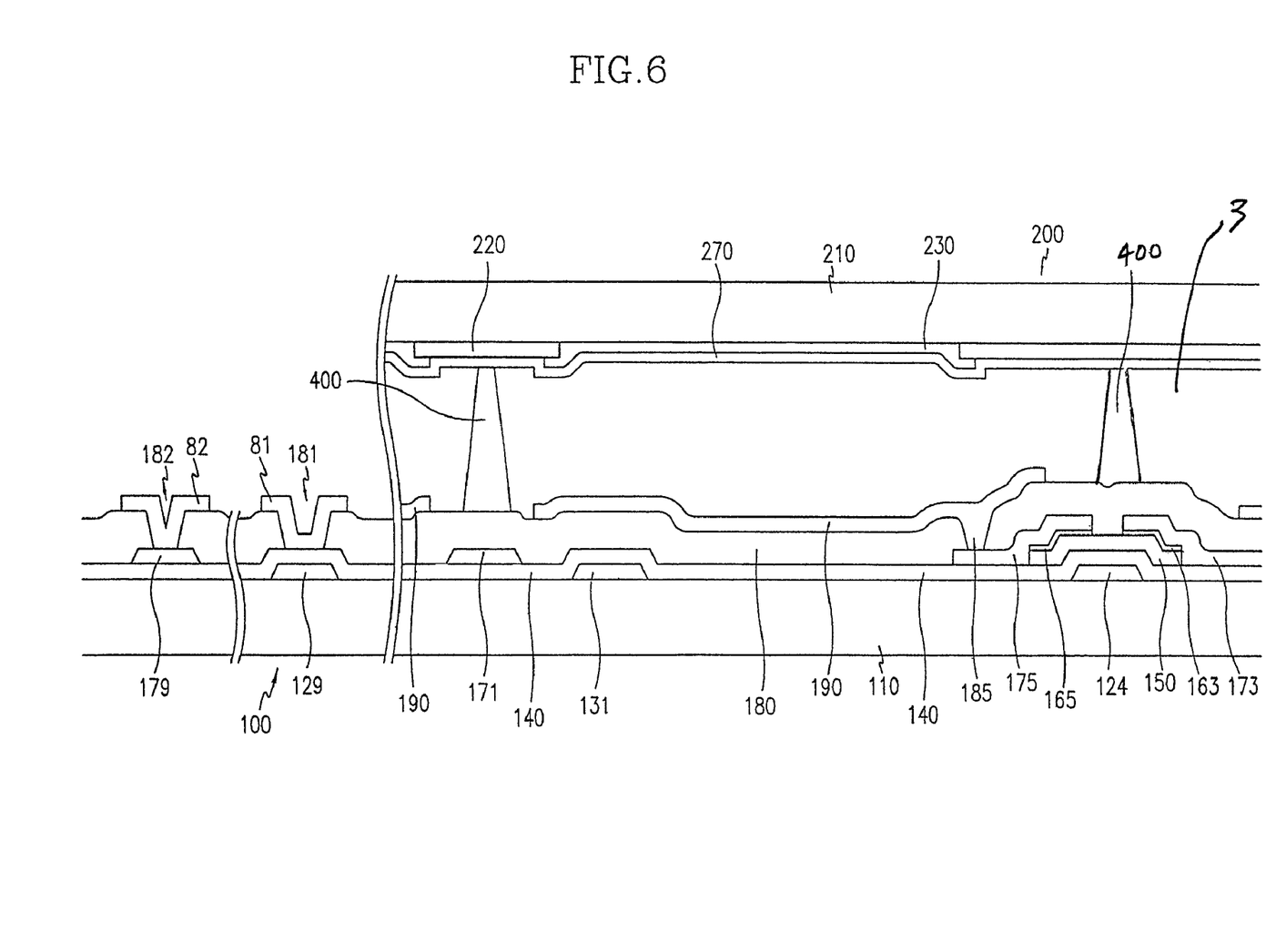
FIG. 6 is a sectional view of the LCD shown in FIG. 5 taken along the line VI-VI' according to an exemplary embodiment of the invention.
Figure 7:
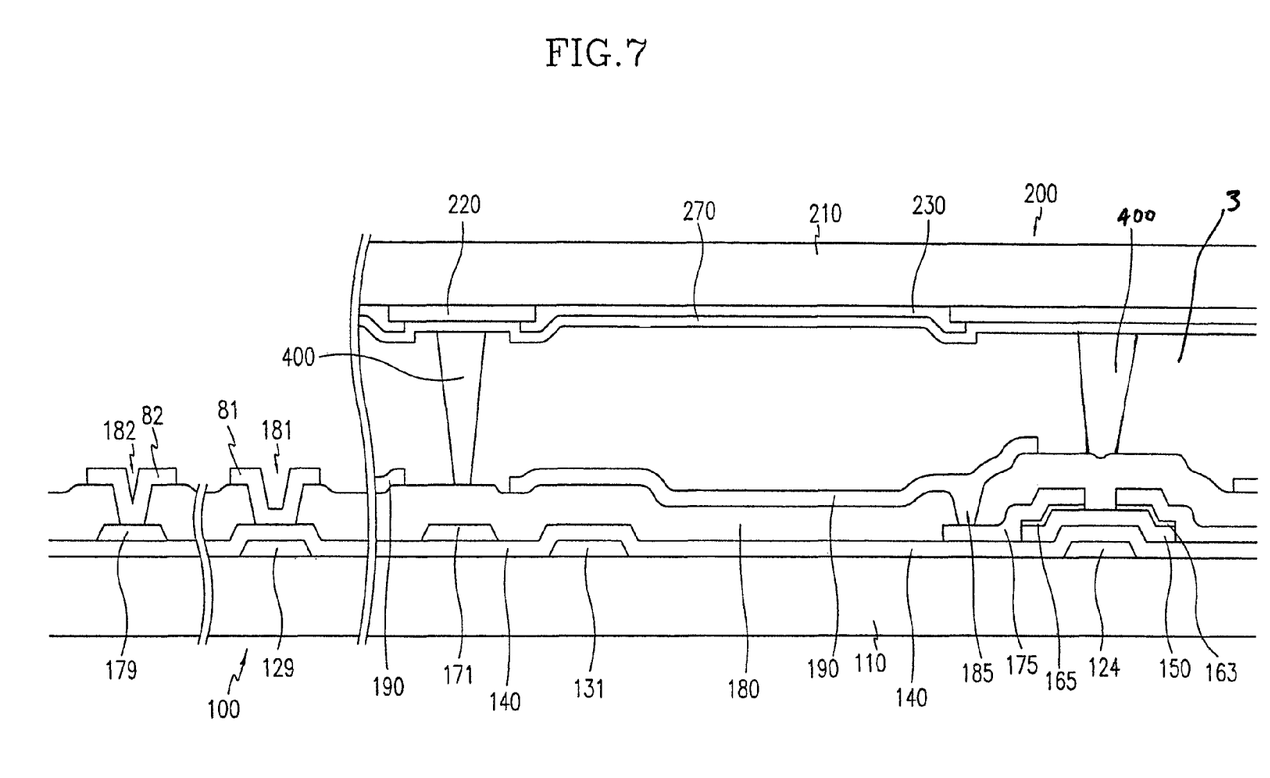
FIG. 7 is a sectional view of the LCD shown in FIG. 5 taken along the line VI-VI' according to another exemplary embodiment of the invention.

FIG. 5 is a layout view of an LCD according to exemplary embodiments of the present invention, FIG. 6 is a sectional view of the LCD shown in FIG. 5 taken along the line VI-VI' according to one exemplary embodiment of the invention, and FIG. 7 is a sectional view of the LCD shown in FIG. 5 taken along the line VI-VI' according to another exemplary embodiment of the invention.

An LCD according to an embodiment of the present invention includes a TFT array panel 100, a common electrode panel 200, and a LC layer 3 and a plurality of column spacers 400 disposed between the panels 100 and 200.

A plurality of gate lines 121 for transmitting gate signals and a plurality of storage electrode lines 131 are formed on an insulating substrate 110.

The gate lines 121 and the storage electrode lines 131 extend substantially in a transverse direction and are separated from each other. A plurality of projections of each gate line 121 form a plurality of gate electrodes 124. The storage electrode lines 131 are supplied with a predetermined voltage such as a common voltage, which is applied to a common electrode 270 on the common electrode panel 200 of the LCD.

The gate lines 121 and the storage electrode lines 131 may have a multi-layered structure including two films, a lower film (not shown) and an upper film (not shown), having different physical characteristics. The upper film is preferably made of low resistivity metal including an Al containing metal such as, for example, Al and Al alloy for reducing signal delay or voltage drop in the gate lines 121 and the storage electrode lines 131. The lower film is preferably made of material such as, for example, Cr, Mo and Mo alloy, which has good contact characteristics with other materials such as indium tin oxide (ITO) or indium zinc oxide (IZO). An exemplary combination of the lower film material and the upper film material is Cr and Al—Nd alloy.

The lateral sides of the gate lines 121 and the storage electrode lines 131 are tapered, and the inclination angle of the lateral sides with respect to a surface of the substrate 110 is in a range of about 30-80 degrees.

A gate insulating layer 140 preferably made of silicon nitride (SiNx) is formed on the gate lines 121 and the storage electrode lines 131.

A plurality of semiconductor islands 150 preferably made of hydrogenated amorphous silicon (abbreviated as "a-Si") or polysilicon are formed on the gate insulating layer 140. The semiconductor islands 150 are located opposite the respective gate electrodes 124.

A plurality of ohmic contact islands 163 and 165 preferably made of silicide or n+ hydrogenated a-Si heavily doped with n type impurity are formed on the semiconductor islands 150.

The lateral sides of the semiconductor islands 150 and the ohmic contacts 163 and 165 are tapered, and the inclination angles thereof are preferably in a range of about 30-80 degrees.

A plurality of data lines 171 and a plurality of drain electrodes 175 separated from each other are formed on the ohmic contacts 163 and 165 and the gate insulating layer 140.

The data lines 171 for transmitting data voltages extend substantially in the longitudinal direction and intersect the gate lines 121 and the storage electrode lines 131. A plurality of branches of each data line 171, which project toward the drain electrodes 175, form a plurality of source electrodes 173. A source electrode 173 and a drain electrode 175 in a pair are separated from each other and opposite each other with respect to a gate electrode 124. A gate electrode 124, a source electrode 173, and a drain electrode 175 along with the semiconductor island 150 form a TFT having a channel between the source electrode 173 and the drain electrode 175.

The data lines 171 and the drain electrodes 175 may also include a lower film (not shown) preferably made of Mo, Mo alloy or Cr and an upper film (not shown) located thereon and preferably made of Al containing metal.

Like the gate lines 121 and the storage electrode lines 131, the data lines 171 and the drain electrodes 175 have tapered lateral sides, and the inclination angles thereof are in the range of about 30-80 degrees.

The ohmic contacts 163 and 165 are interposed only between the underlying semiconductor islands 150 and the overlying source electrodes 173 and the overlying drain electrodes 175 thereon and reduce the contact resistance therebetween.

A passivation layer 180 is formed on the data lines 171, the drain electrodes 175, and exposed portions of the semiconductor islands 150, which are not covered with the data lines 171 and the drain electrodes 175. The passivation layer 180 is preferably made of photosensitive organic material having a good flatness characteristic, low dielectric insulating material such as a-Si:C:O and a-Si:O:F formed by plasma enhanced chemical vapor deposition (PECVD), or inorganic material such as silicon nitride and silicon oxide. The passivation layer 180 may have a double-layered structure including a lower inorganic film and an upper organic film for preventing direct contact between the semiconductor islands 150 and an organic film.

The passivation layer 180 has a plurality of contact holes 182 and 185 exposing end portions 179 of the data lines 171 and the drain electrodes 175, respectively. The passivation layer 180 also has a plurality of contact holes 181 exposing end portions 129 of the gate lines 121. The contact holes 181, 182 and 185 can have various shapes such as, for example, a polygonal or circular shape. The area of each contact hole 181, 182 or 185 is preferably equal to or larger than 0.5 mm×15 μm and not larger than 2 mm×60 μm. The sidewalls of the contact holes 181, 182 and 185 are inclined with an angle of about 30-85 degrees or have stepwise profiles.

A plurality of pixel electrodes 190 and a plurality of contact assistants 81 and 82, which are preferably made of ITO, IZO or Cr, are formed on the passivation layer 180.

The pixel electrodes 190 are physically and electrically connected to the drain electrodes 175 through the contact holes 185 such that the pixel electrodes 190 receive the data voltages from the drain electrodes 175. The pixel electrodes 190 supplied with the data voltages generate electric fields in cooperation with the common electrode 270, which reorient liquid crystal molecules disposed therebetween.

A pixel electrode 190 and a common electrode 270 form a capacitor called a "liquid crystal capacitor," which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131. The capacitances of the storage capacitors, i.e., the storage capacitances can be increased by providing a plurality of storage capacitor conductors, which are electrically connected to the pixel electrodes 190, between the gate insulating layer 140 and the passivation layer 180 opposite the pixel electrodes 190 and the storage electrodes lines 131.

The pixel electrodes 190 can overlap the data lines 171 to increase aperture ratio.

The contact assistants 81 and 82 are connected to the exposed end portions 129 of the gate lines 121 and the exposed end portions 179 of the data lines 171 through the contact holes 181 and 182, respectively. The contact assistants 81 and 82 protect the exposed portions 129 and 179 and complement the adhesiveness of the exposed portions 129 and 179 and external devices.

Portions of the passivation layer 180 near the contact assistants 81 and 82 may be completely removed, and such a removal is particularly advantageous for a chip-on-glass type LCD.

A black matrix 220 for preventing light leakage is formed on an insulating substrate 210, such as, for example, transparent glass. The black matrix 220 includes a plurality of openings facing the pixel electrodes 190 and having substantially the same shape as the pixel electrodes 190.

A plurality of red, green and blue color filters 230 is formed substantially in the openings of the black matrix 220. An exemplary arrangement of the color filters 230 is a stripe type arrangement in which each color filter 230 is arranged in a separate column.

A common electrode 270 preferably made of transparent conductive material such as ITO and IZO is formed on the color filters 230 and the black matrix 220. The common electrode 270 covers the entire surface of the panel 200.

The wider surfaces of the spacers 400 are in contact with the common electrode panel 200 as shown in FIG. 7 or in contact with the TFT array panel 100 as shown in FIG. 6. Although FIGS. 5-7 show the spacers 400 located over the data lines 171 and a TFT, the spacers 400 can be located over the gate lines 121, or any other area covered by the black matrix 220.

A pair of polarizers (not shown) is provided on outer surfaces of the panels 100 and 200.

The LCD may be, for example, a twisted nematic (TN) mode LCD where liquid crystal molecules in the liquid crystal layer 3 having positive dielectric anisotropy are aligned parallel to surfaces of the panels 100 and 200 and the molecular orientations are twisted from the surface of one of the panels 100 and 200 to the surface of the other of the panels 100 and 200 in the absence of an electric field. Alternatively, the LCD may be a vertically aligned (VA) mode LCD, that is, the liquid crystal molecules in the liquid crystal layer 3 with negative dielectric anisotropy are aligned vertical to surfaces of the panels 100 and 200 in the absence of an electric field. Alternatively, the LCD may be an optically compensated bend (OCB) mode LCD, where the liquid crystal molecules have a bend alignment symmetrical with respect to a midplane between the panels 100 and 200 in the absence of an electric field.

A method of manufacturing a panel assembly for an LCD according to an embodiment of the invention is now described in detail with reference to FIGS. 1 and 2 as well as FIGS. 5 and 6.

Referring to FIGS. 5 and 6, a plurality of gate lines 121, a plurality of data lines 171, a plurality of TFTs, a plurality of pixel electrodes 190 and the like are formed on an insulating substrate 110 to form a TFT array panel 100. An organic insulating material is deposited on the panel 100 and patterned by photolithography to form a plurality of spacers 400 between the pixel areas. A black matrix 220, a plurality of red, green and blue color filters 230, a common electrode 270, and so on are formed on another substrate 210 to form a common electrode panel 200. The size of the spacers 400 is preferably equal to about 110-130% of the distance between the panels 100 and 200.

The formation of the spacers 400 using photolithography enables uniform arrangement of the spacers 400 such that a thin uniform cell gap can be obtained throughout the panels 100 and 200 and prevents the spacers 400 from being placed on the pixel electrodes 190, thereby improving display characteristics.

A sealant 500 is coated on one of the panels 100 and 200 as shown in FIGS. 1 and 2. The sealant 500 has a shape of a closed loop without an injection hole for injecting LC. The sealant 500 may be made of thermosetting material or ultraviolet-hardening material and may contain a plurality of ellipsoidal or spherical spacers for keeping the gap between the panels 100 and 200. Since the sealant 500 has no injection hole, it is important to exactly control the amount of the LC material. To avoid an excessive amount of the LC or an insufficient amount of the LC, a buffer region without LC material is preferably provided at the sealant 500. The sealant 500 preferably has an anti-reaction film on its surface, which does not react with the LC layer 3.

LC material is coated or dropped using an LC coater on one of the panels 100 and 200 coated with the sealant 500. The LC coater may have a dice shape such that it can drop the LC material at the LC device areas 101-104. The LC may be sprayed on the entire surface of the LC device areas 101-104. In this case, the LC coater has a shape of a sprayer.

The panels 100 and 200 are delivered to an assembly device having a vacuum chamber. The area surrounded by the panels 100 and 200 and the sealant 500 is evacuated and the panels 100 and 200 are closely adhered to each other using atmospheric pressure such that the distance between the panels 100 and 200 reaches a desired cell gap. The sealant 500 is completely hardened by illumination with an ultra-violet (UV) ray using a light exposer. In this way, the two panels 100 and 200 are assembled to form a panel assembly 120. The two panels 100 and 200 are exactly aligned during the step of adhering the panels 100 and 200 and the step of illuminating the sealant 500.

The panel assembly 120 is separated into the LC device areas 101-104 using a scribing machine.

While the present invention has been described in detail with reference to the preferred embodiments, it is to be understood that the invention is not limited to the disclosed embodiments, but, on the contrary, is intended to cover various modifications and equivalent arrangements included within the spirit and scope of the appended claims.

What is claimed is:

1. A manufacturing method of a liquid crystal display, comprising:
    providing a first panel having gate lines, data lines, thin film transistors, and pixel electrodes and a second panel;
    forming a plurality of spacers on one of the first panel and the second panel;
    coating a sealant on one of the first panel and the second panel;
    providing liquid crystal material on one of the first panel and the second panel, which is coated with the sealant;
    assembling the first panel and the second panel,
    wherein the spacers are located to overlap the data lines, and
    wherein the spacers have a compression deformation equal to or larger than about 0.40 microns in response to about 5 gf.

2. The method of claim 1, wherein the spacers have a tapered shape with an inclination angle in the range of about 20- about 70 degrees.

3. The method of claim 1, wherein providing a first panel having gate lines, data lines, thin film transistors, and pixel electrodes comprises forming a passivation layer over the data lines and the spacers have contact areas with the passivation layer in the range of about 600 to about 1,000 square microns.

4. The method of claim 3, wherein the concentration of the plurality of spacers throughout the panel is about 250 to about 450/cm$^2$.

5. The method of claim 1, wherein the concentration of the plurality of spacers throughout the panel is about 250 to about 450/cm$^2$.

6. The method of claim 1, wherein the spacers have a height in the range of about 2.5- about 5.0 microns.

7. The method of claim 1, wherein a height of the spacers formed on one of the first panel and the second panel is about 110-130% of the distance between the first panel and the second panel and wherein the distance between the first panel and the second panel is a cell gap for the liquid crystal material.

* * * * *